Oct. 3, 1944.  A. B. CRAVATH  2,359,511

DEPTH GAUGE

Filed Jan. 24, 1944

INVENTOR.
ALBERT B. CRAVATH
BY E. Woodbury
ATTORNEY.

Patented Oct. 3, 1944

2,359,511

UNITED STATES PATENT OFFICE 2,359,511

DEPTH GAUGE

Albert B. Cravath, National City, Calif., assignor to Solar Aircraft Company, San Diego, Calif., a corporation of California Application January 24, 1944, Serial No. 519,449

3 Claims. (Cl. 77—55)

This invention relates to drill presses and similar machines for drilling, countersinking and the like, in which it is often desirable to have a stop mechanism for limiting the depth of penetration of the tool into the work.

An object of the invention is to provide a stop mechanism that is simple and inexpensive while at the same time having the rigidity necessary to positively and accurately limit the depth of penetration.

Another object is to provide a positive and accurate stop mechanism that can be readily attached to existing drill presses of standard construction.

Other more specific objects and features of the invention will become apparent from the detailed description to follow of a preferred embodiment of the invention.

It has previously been proposed to limit the depth of penetration of a drill or countersink into a workpiece positioned in a drill press by securing to the vertically reciprocal spindle holder of the press a leg which extends downwardly alongside the drill and terminates in a work-contacting foot that extends laterally toward the drill and comes to rest against the workpiece when the drill has penetrated to the desired depth. However, such a mechanism is inaccurate unless made very strong and heavy because pressure of the foot against the work tends to deflect the leg toward the drill and upwardly, permitting the drill to be forced beyond the desired penetration if the operator applies too much pressure.

In accordance with the present invention, I avoid the necessity of making the leg and foot excessively massive and heavy by providing a guide pin on the lower end of the leg and providing a guide attachable to the bed of the drill press, which bears against the guide pin and prevents lateral deflection of the leg in response to pressure of the foot of the gauge against the workpiece. It is convenient to form the guide in a block attachable to the bed of the press, which block also serves as a support for the workpiece.

Figure 1:
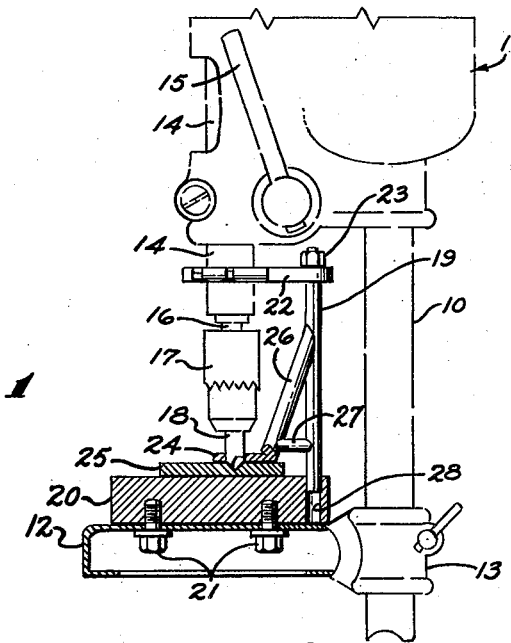
Figure 2:
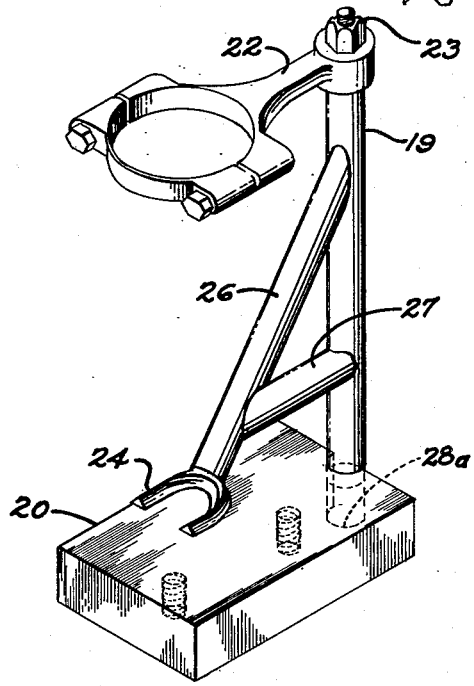

In the drawing Fig. 1 is a side elevation, partly in section, of a portion of a drill press with a depth gauge, in accordance with the invention, attached thereto; and Fig. 2 is a perspective view of a modified form of the invention detached from a drill press.

There is shown in Fig. 1 a portion of a drill press of conventional type, having a vertical standard or column 10, to which there is attached a head 11 and a work-supporting shelf 12, the latter being clamped to the standard 10 by a conventional clamp 13 so that it can be adjusted to any desired level and then locked in position. The head 11 includes a vertically reciprocal spindle holder 14 adapted to be raised and lowered by swinging a feed handle 15. The spindle holder 14 rotatably supports a spindle 16 which carries on its lower end the usual chuck 17, which in the particular embodiment shown holds a countersink 18. The spindle 16 is rotated by a conventional mechanism which is not shown in the drawing.

There is shown attached to the drill press of Fig. 1 a depth gauge consisting of a vertically extending leg 19 which is clamped to the spindle holder 14, and a block 20 which is clamped to the work-supporting shelf 12 by machine screws 21 which are extended upwardly through holes provided in the shelf 12 into threaded holes in the block 20.

The leg 19 may have rigidly secured thereto at its upper end a horizontally extending clamp 22 which encircles and is clamped to the holder 14. The clamp 22 may be secured to the upper end of the leg 19 by providing a reduced upper end section on the leg which extends through an aperture in the clamp 22 with a nut 23 screwed onto the threaded upper end of the leg 19 to lock the clamp in place.

Secured to the leg 19 is a horizontal foot 24 adapted to bear against the workpiece 25 and limit downward movement of the spindle holder 14, spindle 16, chuck 17 and countersink 18. In the particular construction shown the foot 24 is bifurcated to straddle the countersink 18 and is secured to the leg 19 by a slanting bar 26 and a horizontal bar 27 which may be welded to each other and to the leg 19.

The block 20, which supports the workpiece 25 has a guide hole 28 which slidably receives the lower end of the leg 19 to prevent the leg from deflecting laterally when the foot 24 is forced down against the workpiece. When the countersink has been forced to the desired depth (by means of the feed handle 15), the foot 24 contacts the workpiece 25 and positively prevents further penetration of the countersink into the workpiece. However, if the lower end of the leg 19 were not guided by the aperture 28 in the block 20, the foot 24 could be forced upwardly with respect to the spindle holder 14, with accompanying bending of the leg 19 to the left, thereby permitting penetration of the countersink into the workpiece to a greater extent than that desired. By slidably supporting the lower end of the leg 19 in the manner shown, the depth of penetration is very accurately limited despite substantial variations in the feeding force applied to the countersink and without making the leg 19 and clamp 22 excessively heavy.

It is not essential that the guide in the block 20 be a hole completely containing the lower end of the leg 19 since it is only necessary to prevent movement of the lower end of the leg toward the tool (the countersink 18 in this instance). Hence the guide aperture or recess in the block 20 may be simply a groove as shown at 28a in the modification of Fig. 2. In all other respects the modification of Fig. 2 is identical with that shown in Fig. 1 and corresponding parts bear the same reference numerals.

Although for the purpose of explaining the invention certain specific embodiments thereof have been shown in the drawing and described in detail, various departures from the exact construction shown can be made while still utilizing the invention and the latter is therefore to be limited only to the extent set forth in the appended claims.

I claim:

1. A depth gauge of the type described for attachment to a drilling machine having a work-supporting member and a spindle holder reciprocal toward and away from said work-supporting member to feed a tool-supporting spindle, said gauge comprising: a leg having means on one end thereof for securing it to said spindle holder and having on the other end a foot extended laterally to engage a workpiece at a point thereon closely adjacent the axis of said spindle; and a frame member adapted to be anchored to said work-supporting member; said leg and said frame member having cooperating linear guide means thereon for preventing lateral deflection of the said other end of said leg toward the axis of said spindle.

2. A depth gauge of the type described for attachment to a drilling machine having a work-supporting member and a spindle holder reciprocal toward and away from said work-supporting member to feed a tool-supporting spindle, said gauge comprising: a leg having means on one end thereof for securing it to said spindle holder and having on the other end a foot extended laterally to engage a workpiece at a point thereon closely adjacent the axis of said spindle; and a frame member adapted to be anchored to said work-supporting member; said leg comprising a pin member on its lower end and said frame member having a guide recess for slidably receiving said pin and preventing lateral deflection of said pin toward the axis of said spindle.

3. A depth gauge of the type described for attachment to a drilling machine having a work-supporting member and a spindle holder reciprocal toward and away from said work-supporting member to feed a tool-supporting spindle, said gauge comprising: a leg having means on one end thereof for securing it to said spindle holder and having on the other end a foot extended laterally to engage a workpiece at a point thereon closely adjacent the axis of said spindle; and a frame member adapted to be anchored to said work-supporting member; said leg and said frame member having cooperating linear guide means thereon for preventing lateral deflection of the said other end of said leg toward the axis of said spindle and said frame member comprising a plate interposed between the said work-supporting member and the workpiece.

ALBERT B. CRAVATH.